June 3, 1930.  D. H. SWEET  1,761,694

SPEEDOMETER

Original Filed March 10, 1921

Witness
John E. Titus

Inventor
Donald H. Sweet

Patented June 3, 1930

1,761,694

UNITED STATES PATENT OFFICE

DONALD H. SWEET, OF EVANSTON, ILLINOIS

SPEEDOMETER

Application filed March 10, 1921, Serial No. 451,379. Renewed June 12, 1929.

My invention relates to speed indicating devices, and more specifically to an improved device operating with a fluid medium to measure the speed of a moving body. The operation of such devices may depend on viscosity, or kinetic interchange by actual displacements or both.

One object of the invention is to correct automatically for variations in temperature of the fluid medium, and corresponding variations in viscosity and density.

Another object is to secure a measuring force strictly proportional to speed. This has heretofore been obtained in magnetic drag speedometers, but can also be theoretically obtained where the transmission is by fluid viscosity only.

As far as I am aware, no practicable devices operating by viscosity only have heretofore been available. Such a device must be free from errors due to variations in temperature and pressure, and be easily adjusted and calibrated.

Another object is to correct automatically for variations in density resulting from variations in pressure.

The complete object to be obtained is complete automatic correction for all variations in the operative effect of the fluid medium employed.

Another object is to provide a very simple arrangement for compensation for the above variations by means of a very slight readjustment of the parts.

Another object is to provide a speed indicator operating with a fluid medium, having a minimum number of parts, of shapes easy to manufacture and assemble, and durable in service.

Further objects and advantages of my invention will become apparent as the description proceeds.

Figure 1:
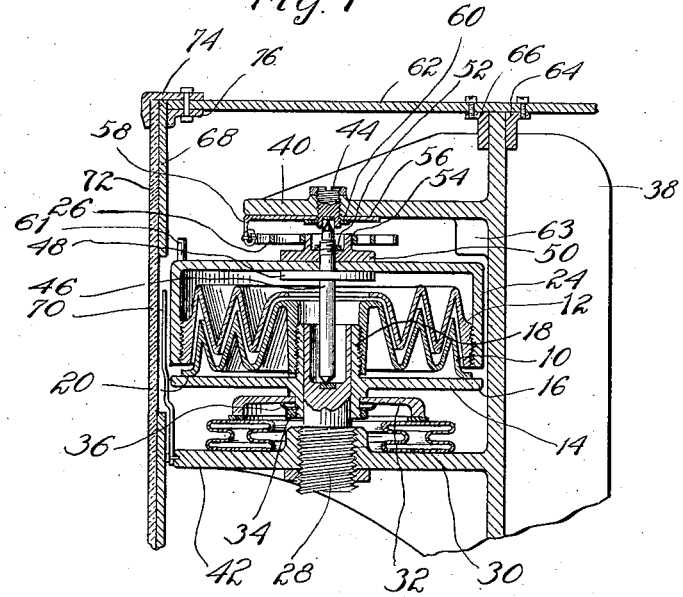

In the accompanying drawings Fig. 1 is an enlarged section through a portion of a speed indicating device, illustrating the application of the principles of my invention thereto.

Figure 2:
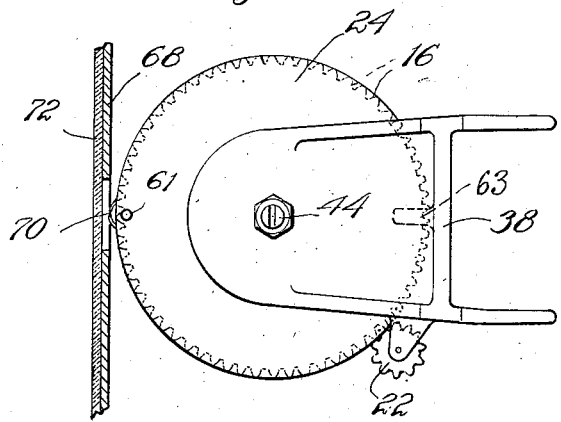

Fig. 2 is a plan view of the same parts, with the casing removed, and the front covers in section.

In the embodiment of my invention selected for illustration the driving element 10 is in the form of a corrugated body of revolution, having a series of grooves receiving the corrugations of the driven or measuring element 12. The opposing walls of the two elements, between which walls lies the portion of the fluid medium operating to transmit force between the two, may be roughened or otherwise corrugated, or left smooth, according to the nature of the medium and the conditions of service.

The driving element is connected to the body, the speed of which is to be measured. In the structure shown the driving element is mounted on a carrier comprising a disk-like portion 14 having gear teeth 16 on its periphery, and a sleeve portion 18. The driving element 10 is threaded onto the sleeve 18 and preferably rests at its outer edge at 20 on the disk-like portion 14 for purposes of rigidity and alinement. A pinion 22 may transmit motion from the body whose speed is to be measured, to the carrier. In case of a vehicle, the pinion 22 may be driven from the wheel of the vehicle in any preferred manner.

The driven element 12 is threaded or otherwise suitably mounted in a cup-shaped indicating element 24, having on its outer periphery the usual indicia (not shown) for indicating the speed of the driving element. Resilient means in the nature of a coiled spring 26 are employed to provide a restoring torque acting on the driven element approximately proportional to the displacement thereof.

To compensate for variations in the effectiveness of the fluid medium, I prefer to vary the space between the surfaces subjected to the action of the medium. For this purpose I provide surfaces inclined to the axis of rotation of the parts, and move the parts axially toward and away from each other to vary the thickness of the layer of fluid medium between the co-operating surfaces. As illustrated, the driving member 10 is made axially movable by sliding on the pintle 28. The device illustrated operates with air as the fluid medium, and the effectiveness of the air layer to transmit force will decrease with rise in temperature, due to decreased density and viscosity, and increase with rise in pressure, due to increased density. I have provided a single element sensitive to both pressure and temperature, and a connection between the element and the driving member for determining its axial adjustment to effect the desired correction.

The element 30 comprises in this instance an annular shell of the type usually employed in barometers. This shell 30 is preferably filled with air at approximately atmospheric pressure and hermetically sealed. The pressure inside the shell will therefore be a function of temperature alone, and will increase with increase of temperature. The pressure on the outside of the shell will be that of the atmosphere. The changes in the dimensions of the shell will therefore represent the compounded result of both these pressures, and the dimensions will increase with increase of temperature and decrease of pressure, or vice versa. This is precisely the variation necessary to effect shifting of the axial position of the driving element to compensate for changes in pressure and temperature. Furthermore, by varying the amount of air inside the shell, its sensitivity to temperature change may be altered without affecting its sensitivity to changes in atmospheric pressure. Over a wide range, therefore, any desired ratio of the two sensitivities may be obtained.

In the construction shown the shell encircles the pintle 28 and supports an annular plate 32 engaging a shoulder 34 on the sleeve 18 to support the driving element itself. Resilient means for keeping the shoulder and the plate in contact are preferably provided. I have shown a spring washer 36 and retaining nut for this purpose.

A frame 38 is provided for supporting the movable parts of the apparatus, said frame having arms 40 and 42, the lower one of which supports the pintle 28 and the upper one of which supports a bearing 44 for the upper end of the pintle 46 which carries the driven element. To provide stationary bearings for the pointed ends of the pintle 46, the lower pintle is recessed at its upper end. This also contributes materially to the compactness of the structure. Pintle 46 has a flange 48 preferably formed integral therewith, against which the indicating element 24 is clamped by a clamping plate 50 and nut 52. The clamping plate 50 preferably carries an upwardly projecting annulus 54 to which the inner end of the coil spring 26 may be attached. Complete adjustment for the spring constant and zero setting is provided by a plate 56 having an ear 58 depending from its periphery, said plate being clamped in adjusted position by a nut 60 threaded on the bearing 44. Indicating element 24 may if desired carry a limit stop 61, adapted to engage a web 63 projecting from the frame 38.

Part 38 is preferably but not necessarily a casting; but all the other parts may be either screw machine products, or metal stampings. Thus parts 14, 28, 44 and 46 are shapes easily manufactured by an automatic machine of the screw machine type, and parts 10, 12, 24, 32, 36, 56 and 70 may be metal stampings.

In assembling the parts above described, the driven element 12 is first assembled with the indicating element 24, and pintle 46. The shell 30, plate 32, carrier, driving element 10, and driven element 12 with associated parts, are all placed in approximate position resting on arm 42. Pintle 28 is then inserted from below and screwed into position until the driven element is lifted off the driving element. Bearing 44 is adjusted to properly engage pintle 46, spring 26 is connected to plate 56 at a predetermined point to provide the proper spring constant for the particular design of instrument involved, and plate 56 is then clamped so as to bring the indicating element to a zero reading.

The driving element is now rotated at a predetermined speed and the amount registered by the indicating element observed. If the reading is too low, the driven element is lowered slightly by adjusting bearings 28 and 44 until a correct reading is obtained. The parts are now ready for use and may be assembled in the casing 62 by sliding them in from the front and clamping retaining rings 64 and 66 in place. The metal cover 68, which is shaped to provide clearance for the pointer 70, is now placed in position, and over it a glass plate 72, both covers being held in place by retaining rings 74 and 76.

While I have illustrated and described in detail the embodiment of my invention at present preferred, it should be clearly understood that the description is only for purposes of illustration and that many variations and modifications will naturally occur to those skilled in the art. It should be particularly noted that certain aspects of my invention are not limited to indicators in which the fluid medium is gaseous. I aim in the subjoined claims to cover all legitimate variations and modifications of my invention.

I claim as my invention:—

1. In a device of the class described, a driving and a driven element, a layer of fluid separating said elements and constituting the driving connection between them, a single element sensitive to variations in temperature and pressure, and means for varying the thickness of said fluid layer in proportion to the response of the sensitive element.

2. In a device of the class described, a driving and a driven element, means supporting one element for rotation only, means supporting the other element for rotation and axial sliding movement, and means for moving the last mentioned element toward the nonslidable element responsive to increase in temperature or decrease in pressure and vice versa.

3. In a device of the class described, two supports, driving and driven elements between said supports, one of said elements being capable of rotation only, and the other being also axially slidable, and a barometric annulus controlling the sliding of said last mentioned element.

4. In a device of the class described two supports, driving and driven elements between said supports, one of said elements being axially movable with respect to said supports and the other element, and barometric means controlling the movement of said last mentioned element.

5. In a device of the class described, a support, driving and driven elements supported thereby, one of said elements being axially movable with respect to the support and the other element, and a barometric element filled with gas, controlling the movement of said movable element.

6. In a device of the class described, driving and driven elements, a gaseous fluid medium transmitting force between the same due to viscosity only, and means for automatically varying the amount of said medium between said elements as a function of temperature to compensate for accompanying changes in viscosity.

7. In a device of the class described, driving and driven elements, a fluid medium transmitting force between the same due to viscosity only, and means for automatically varying the amount of said medium between said elements as a function of pressure to compensate for accompanying changes in viscosity.

8. In an instantaneous speed measuring device, a continuously rotary driving element, a driven element constrained against continuous rotation and resiliently urged toward a predetermined position with a force depending on its displacement from said position, a gaseous fluid medium transmitting force between said driving and driven elements due to viscosity only, said elements each having a plurality of conical annular surfaces, each annular surface lying close to an annular surface on the other element to form a pair of cooperating surfaces, said pairs of surfaces lying at such angles that a relative axial movement between said elements will simultaneously increase or decrease the spaces between all said pairs of surfaces, and means limiting the relative axial displacement of said surfaces to a relatively small fraction of their axial dimensions.

9. In an instantaneous speed measuring device, a continuously rotary driving element, a driven element constrained against continuous rotation, and resiliently urged toward a predetermined position with a force depending on its displacement from said position, a layer of gaseous fluid separating said elements and constituting the driving connection between them due to its viscosity, and means for correcting for variations in the effectiveness of the fluid medium, by varying the thickness of the layer during use.

10. In an instantaneous speed measuring device, a continuously rotary driving element, a driven element constrained against continuous rotation and resiliently urged toward a predetermined position with a force depending on its displacement from said position, a layer of gaseous fluid separating said elements and constituting the driving connection between them due to its viscosity, and means for varying the thickness of the layer by axial adjustment of one of the elements during use.

11. In an instantaneous speed measuring device, a continuously rotary driving element, a driven element constrained against continuous rotation, and resiliently urged toward a predetermined position with a force depending on its displacement from said position, said elements having opposing surfaces lying at an oblique angle to their axes of rotation, automatic means for varying the axial separation of said surfaces during operation, and manual adjustment means for varying the position of said elements to shift the range of operation of said automatic means.

12. In an instantaneous speed measuring device, driving and driven elements arranged in proximity with an air gap between them, means for transmitting torque from the driving to the driven element without mechanical contact between them, said transmitting means being affected by varying the proximity of said elements and also by changes in temperature, and temperature sensitive means for varying the proximity of said elements to compensate for variations in temperature.

13. In an instantaneous speed measuring device, driving and driven elements, arranged in proximity with an air gap between them, means for transmitting torque from the driving to the driven element without mechanical contact between them, said transmitting means being affected by varying the proximity of said elements and also by changes in temperature, and a metallic element sensitive to changes in temperature for varying the proximity of said driving and driven elements to compensate for variations in temperature.

In testimony whereof, I have hereunto set my hand.

DONALD H. SWEET.